UNITED STATES PATENT OFFICE.

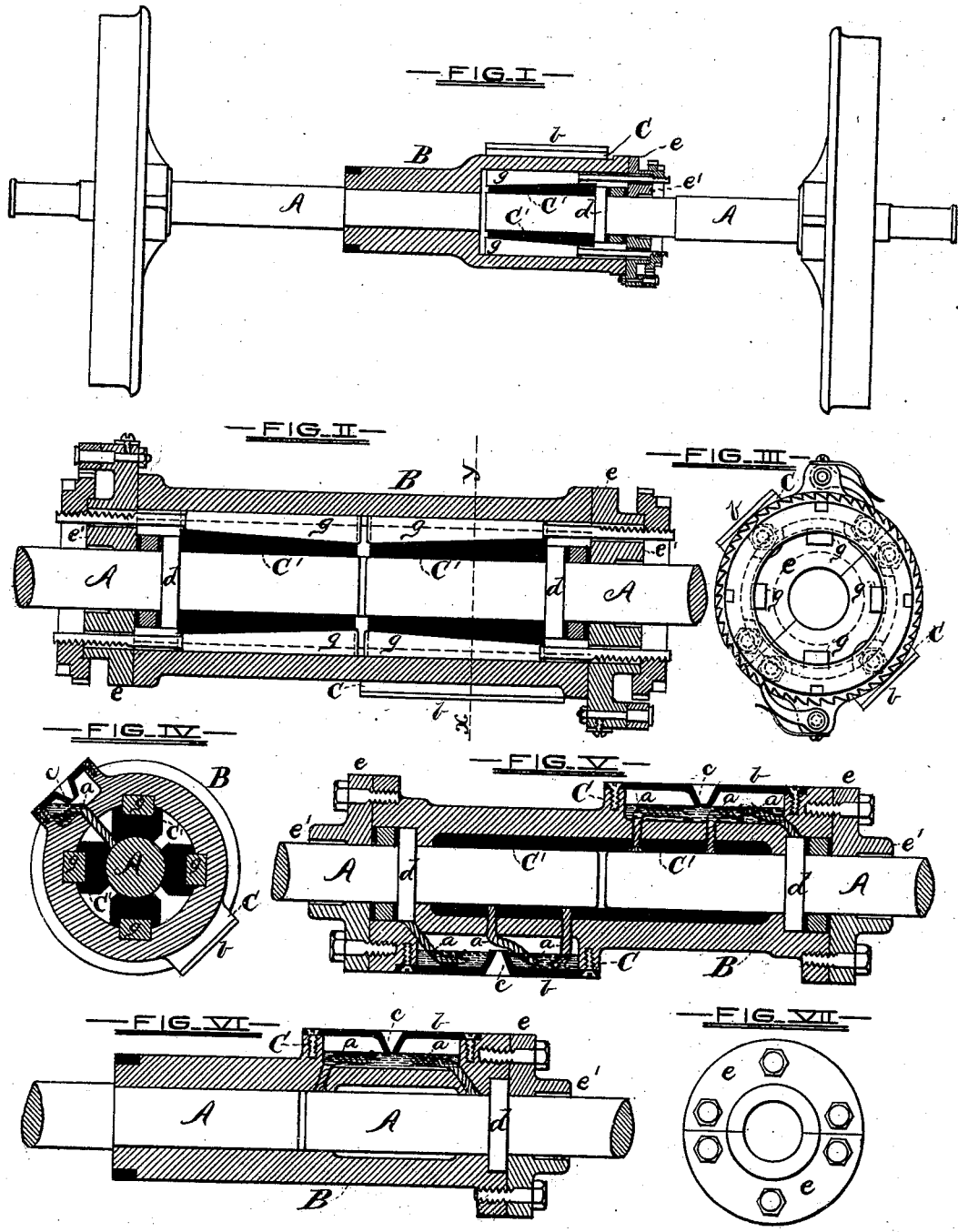

WILLIAM W. TOWSON, OF BALTIMORE, MARYLAND, ASSIGNOR OF ONE-HALF HIS RIGHT TO ALBERT H. HENDERSON, OF SAME PLACE.

IMPROVEMENT IN CAR-AXLES.

Specification forming part of Letters Patent No. 197,692, dated November 27, 1877; application filed April 27, 1877.

*To all whom it may concern:*

Be it known that I, WILLIAM W. TOWSON, of the city of Baltimore and State of Maryland, have invented certain Improvements in Car-Axles, of which the following is a specification; and I do hereby declare that in the same is contained a full, clear, and exact description of my said invention, reference being had to the accompanying drawing, and to the letters of reference marked thereon.

This invention relates to certain improvements in that class of car-axles which consists of two parts or sections, connected together in such manner as to allow of their independent rotation, thus forming an axle which is free from the torsional strain to which ordinary solid axles are subjected in the rounding of curves.

In the present invention the coupling and its attachments are constructed and connected to the inner ends of the independent sections of the axle, with special reference to the utilization of the old axle, and to the means for lubricating the rubbing surfaces of the axle and the parts of the coupling in contact therewith, as will hereinafter fully appear.

In the description of the invention which follows, due reference must be had to the accompanying drawing, forming a part of this specification, and in which—

Figure 1 is a longitudinal view of an axle having wheels attached thereto, connected in accordance with my invention. Fig. 2 is a longitudinal section of the coupling, with parts of the two sections of the axle on an enlarged scale. Fig. 3 is an end view of the coupling. Fig. 4 is a transverse section of the coupling and axle, on the line $x\ y$. Fig. 5 illustrates the arrangement of the lubricating devices, and also a slight modification in the devices for reducing wear. Fig. 6 illustrates further modifications in the arrangement of the coupling and its connections. Fig. 7 is an end view of Fig. 6.

Similar letters of reference indicate similar parts of the invention in all the views.

A A are the two sections of the axle, the inner ends of which are connected by the coupling B. This coupling consists of a cylinder-sleeve in one piece, adapted to turn independently of one or both sections of the axle.

The former method is shown in Figs. 1 and 6, and the latter method in the remaining figures of the drawing.

An oil-box, C, cast upon the outside of the coupling, is connected to the surface of the axle by means of holes, preferably supplied with wicks $a\ a$. The oil-box is covered with a lid, $b$, having an introverted conical filling-tube, $c$, which serves to prevent leakage of oil when the oil-box is below or underneath the axle. The filling-tube $c$ may, if desired, have a hinged lid, to exclude dust therefrom. The coupling B is provided with an anti-friction inner casing, $C'$, either in one piece or in sections, the latter design admitting of radial adjustment of the sleeve, to compensate for wear, by means of the devices hereinafter described.

Collars $d$ on the axle, in connection with flanges $e$, in sections, as shown, prevent the withdrawal of the axle from the coupling; but a limited extensible movement is allowed, to suit slight variation in the gage of the track, by means of rubber washers, which are located between the collars $d$ and the flanges $e$. The rubber washers are protected against wear of their flat surfaces by means of metallic washers, located as shown.

The limited extensible movement of the axle also prevents, to a great extent, the jar of the wheels being communicated to the car-body, and thereby serves to obviate the loosening of joints in the same. It also adds to the comfort of the passengers seated in the car.

The mechanism for imparting the radial movement to the anti-friction casing, when the same is formed in sections, consists of tapering bolts $g$, which rest within similarly-shaped grooves in the sections of the casing, and are moved outwardly, to take up wear, by means of a threaded ring resting on the outer ends of the said bolts, as shown in Figs. 1, 2, and 3. This device has the advantage of causing a uniformity of movement to the tapering bolts. The threaded ring is provided with teeth, which, in combination with a spring-pawl hinged to the flange $e$, prevents its being turned, except in such direction as to cause the extension of the bolts. The flanges $e$, before described, have extensions $e'$, which are slightly larger in internal diameter than the axle, for the purpose of preventing the admission of dust to the wearing parts of the same.

The anti-friction casing shown in Fig. 5 of the drawing is unprovided with any means for effecting the radial adjustment of the same, and in Fig. 6 the said casing is dispensed with.

Having thus described my invention, what I claim as new, and wish to secure by Letters Patent of the United States, is—

1. In combination with the cylindrical coupling B, the sections A A of the axle, one or both of which sections are provided with collars $d$, secured thereto and resting within recesses in the ends of the said coupling, and the flanges $e$, the said flanges being made in sections, to allow of their being placed over or beyond the said collars on the axle, and bolted to the ends of the said coupling, substantially as herein set forth.

2. In combination with the sections A A of the car-axle, adapted to rotate independently of each other and within the coupling B, an independent set or system of radially-adjustable sections of an anti-friction casing for each section of the axle, the adjustability of the sections of the said casing being obtained by means of tapering bolts resting upon the same, and a threaded ring adapted to cause a combined longitudinal movement of the said bolts, substantially as herein described.

3. In combination with a coupling provided with flanges and two sections or parts, A, of the axle, having collars, as shown, gum or other flexible washers located between the said collars and flanges, substantially as and for the purpose herein set forth.

In testimony whereof I have hereunto subscribed my name this 24th day of April, in the year of our Lord 1877.

WILLIAM W. TOWSON.

Witnesses:
WM. T. HOWARD,
THOMAS MURDOCK.